US006259317B1

(12) United States Patent
Melanson (10) Patent No.: US 6,259,317 B1
(45) Date of Patent: Jul. 10, 2001

(54) OUTPUT STAGE UTILIZING A FLOATING POWER SUPPLY

(75) Inventor: John Laurence Melanson, Boulder, CO (US)

(73) Assignee: Audio Logic, Inc., Boulder, CO (US)

( * ) Notice: Subject to any disclaimer, the term of this patent is extended or adjusted under 35 U.S.C. 154(b) by 0 days.

(21) Appl. No.: 09/404,452

(22) Filed: Sep. 22, 1999

(51) Int. Cl.$^7$ ............................... H03F 3/38; H03F 3/217
(52) U.S. Cl. ............................ 330/10; 330/207 A
(58) Field of Search ......................... 330/10, 207 A, 330/251; 363/41

(56) References Cited

U.S. PATENT DOCUMENTS

| 3,510,749 | 5/1970 | Resch | 363/42 |
|---|---|---|---|
| 4,424,557 | 1/1984 | Steigerwald | 363/98 |
| 4,500,844 | * 2/1985 | Lisco | 330/10 |
| 4,949,048 | * 8/1990 | Tokumo et al. | 330/10 |
| 5,023,150 | 6/1991 | Takabayashi | 429/22 |
| 5,365,422 | 11/1994 | Close et al. | 363/98 |
| 5,923,548 | 7/1999 | Kammiller | 363/56 |

OTHER PUBLICATIONS

EPO Patent Abstracts of Japan entitled, "Power Supply," by Hitsuma Shinji on behalf of Matsushita Electric Works Ltd. Publication No.: 11243691, Publication Date: Sep. 1999, Application No.: 10042649, Application Date: Feb. 1998.
EPO Patent Abstracts of Japan entitled, "Power Converter," by Osada Noriaki on behalf of Toshiba Corp. Publication No.: 07007961, Publication Date: Jan. 1995, Application No.: 05142435, Application Date: Jun. 1993.
European Patent Application entitled, "PWM Power Converter," by Nishizawa et al. Publication No.: 0284021 A2, Publication Date: Sep. 1988, Application No.: 88104565.2, Application Date: Mar. 1988.

* cited by examiner

Primary Examiner—Steven J. Mottola
(74) Attorney, Agent, or Firm—Jennifer L. Bales; Macheledt Bales & Johnson LLP (57) ABSTRACT

A switching output stage for Class D amplifiers and the like utilizes a floating power supply providing a relative positive output voltage VP at a first line and a relative negative output voltage VM at a second line. Two switches are connected in parallel across the two lines. The first switch has a common to ground and switches between VP and VM, and the second switch has a common to a low pass output filter and switches between VP and VM. The input to the filter can take on three values, VP, VM, and 0. The input VP to the filter is achieved by switching the first switch to VM and the second switch to VP, and the input VM to the filter is achieved by switching the first switch to VP and the second switch to VM. The input 0 to the filter may be achieved by switching both the first switch and the second switch either to VP or to VM.

21 Claims, 11 Drawing Sheets

OUTPUT STAGE UTILIZING A FLOATING POWER SUPPLY

BACKGROUND OF THE INVENTION

1. Field of Invention

The present invention relates to an output stage for Class D amplifiers and the like, including a power supply that is floating with respect to ground, or any other reference except the supply pins.

2. Description of Prior Art

Class D amplifiers are desirable in audio power amplifiers and the like, because they are efficient, and can handle high power signals. The high efficiency allows for smaller power supplies, and smaller heat sinks.

Figure 1:
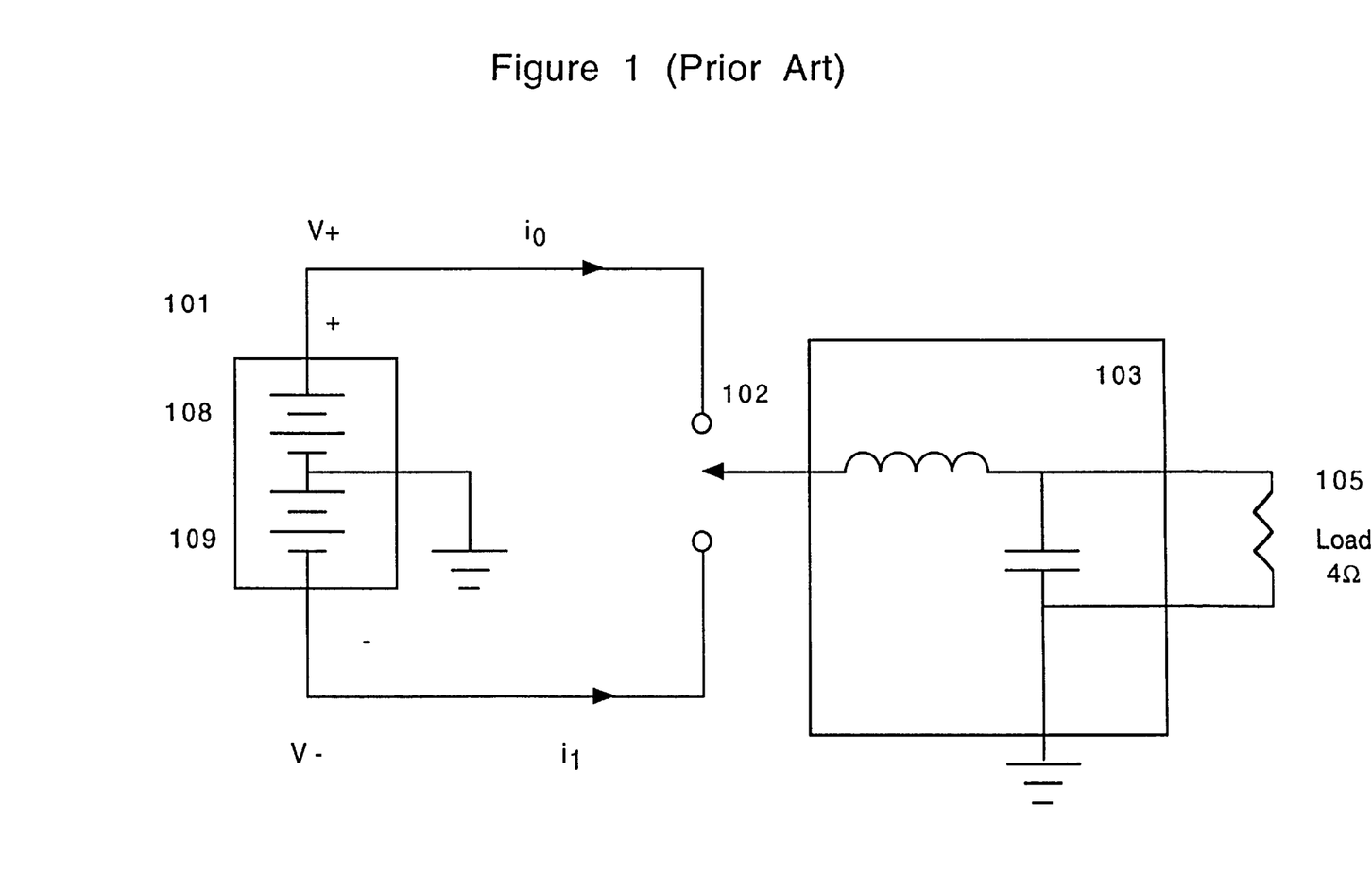
FIG. 1 (prior art) is a block diagram showing a conventional Class D output stage, including a power supply block and a filter block.

Class D amplifiers typically use an output stage similar to the shown in FIG. 1 (prior art). It includes a power supply block 101 which includes two individual power supplies 108 and 109 to supply positive and negative voltages V+ and V−. These voltages are typically equal in magnitude, but differ in polarity. Power supply block 101 is referenced to ground. The output is also referenced to ground. In general it is desirable to have the output referenced to ground, as this makes radio frequency interference easier to control, and is necessary in some installations. It is also desirable to achieve bipolar (plus and minus) output without the use of a coupling capacitor, especially if low frequency operation is needed, where a very large capacitor would be required.

Power supply 101 supplies a positive and negative voltage. Switch 102 is a single pole double throw (SPDT) switch, generally constructed from fast semiconductor devices, such as field effect transistors. Filter 103 is a low pass filter, designed to pass the audio band frequencies to load 105 (e.g. a speaker or other power device), while removing the switching frequencies. The switching frequency is typically 100 kHz–3 MHz. The duty cycle of the output is varied to produce any desirable output voltage.

Figure 2A:
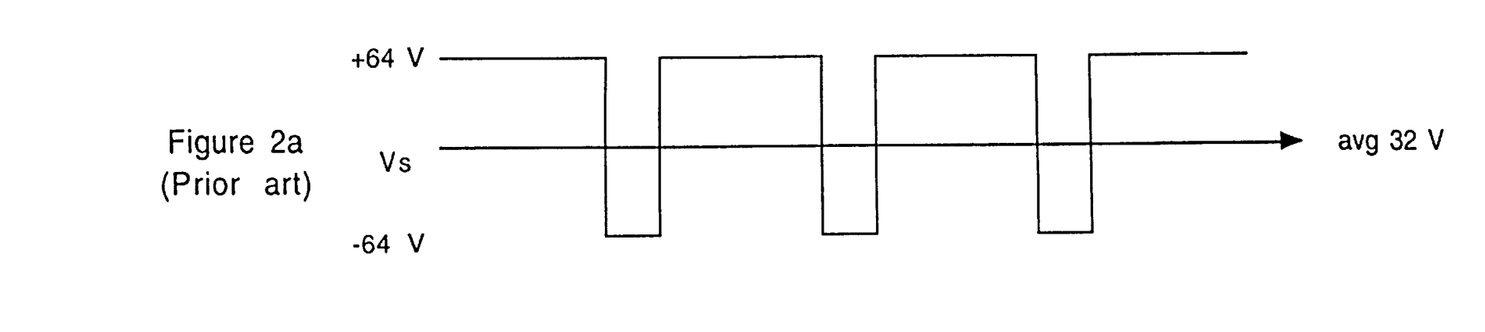
FIG. 2a (prior art) is a plot showing the voltage provided to the filter of the output stage of FIG. 1.

When a low frequency, high amplitude signal is amplified, significant energy is passed between the two power supplies 108 and 109. FIG. 2 shows why this occurs. Assume that the power supply outputs V+ and V− are set to plus and minus 64 volts, and that the amplifier is connected to a 4 ohm load 105. Assume that the input signal is requesting a +32 volt output. For simplicity, assume that the switch is perfect, and has no on resistance, infinite off resistance, and switches instantly. The switch waveform necessary to make a 32 volt output will have 102 in the positive position 75% of time, and in the negative position 25% of the time. This is shown as Vs.

Figure 2B:
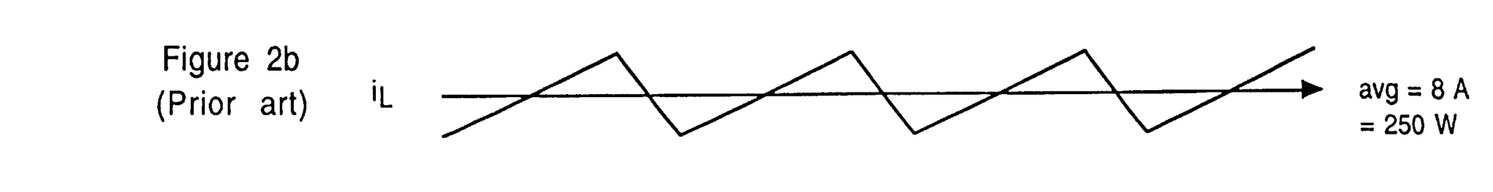
FIG. 2b (prior art) is a plot showing the current into the filter of the output stage of FIG. 1.

FIG. 2b shows the current into the inductor of the low pass filter 103 (shown here as a simple LC section), labeled $i_l$, and having an average value of 8 Amps. The current ramps up and down somewhat during each cycle, with the exact character of the wave shape determined by the design of low pass filter 103. The power delivered to load 105 is 8 Amps*32 Volts, or 256 Watts. All of the analysis done here is slightly approximated, as the current wave shapes and their averages are modified by the characteristics of the filter, but the results of real world circuits are very close to these approximations, and the above example serves to illustrate the technical difficulties of building switched amplifier systems. In the illustrations, the current is shown as a linear ramp.

Figure 2C:
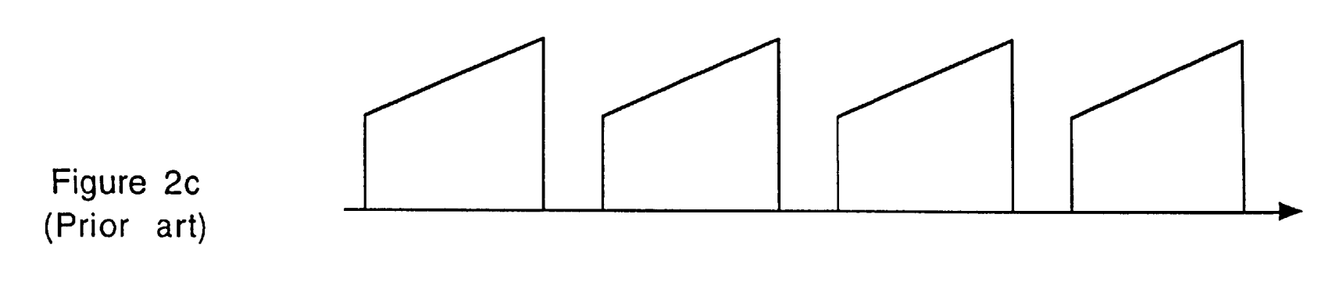
FIG. 2c (prior art) is a plot showing the current delivered by the positive power supply of the power supply block of FIG. 1.
Figure 2D:
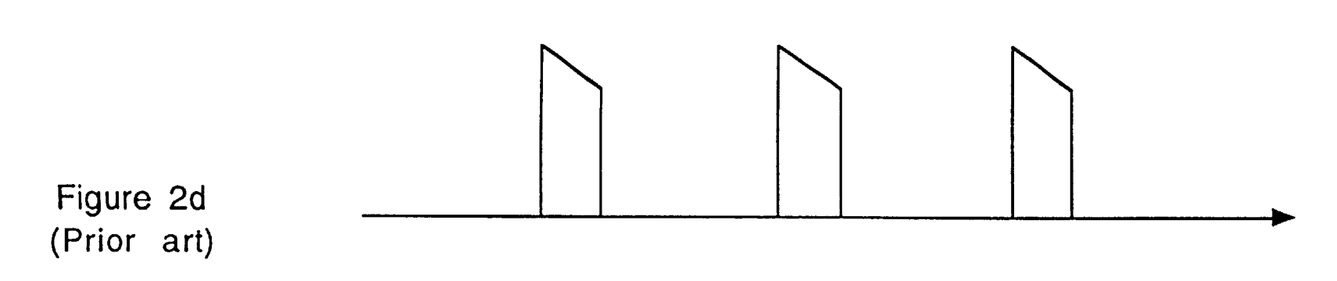
FIG. 2d (prior art) is a plot showing the current delivered by the negative power supply of the power supply block of FIG. 1.

The waveform of FIG. 2c shows the current delivered by the positive power supply, which delivers current for 75% of the time. While delivering the current, the average delivered is again 8 Amps, for an overall average of 6 Amps. The power delivered by the supply is therefore 6 Amps*64 Volts, or 384 Watts. The negative supply also delivers current in a positive sense. This is shown in FIG. 2d. The average current is 2 Amps, for a delivered power of 2 Amps*−64 Volts, or −128 Watts.

Figure 3:
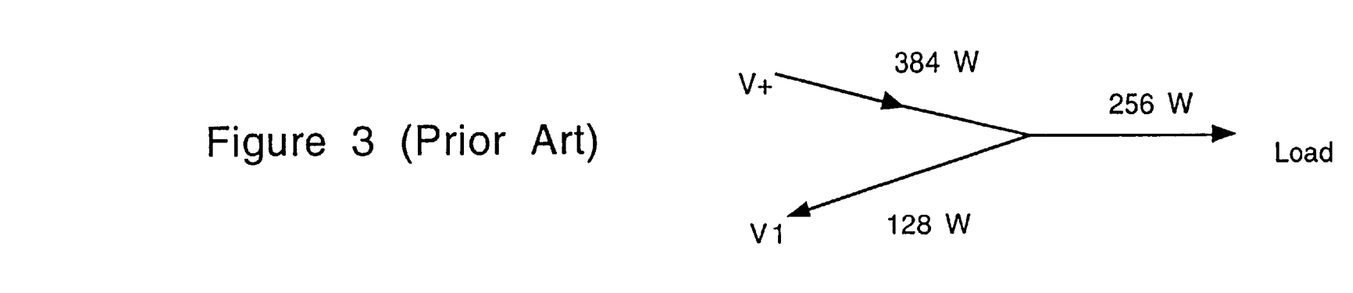
FIG. 3 illustrates the power flow of the design of FIG. 1.

FIG. 3 illustrates the power flow of the design of FIG. 1. What is happening is that, of the 384 Watts drawn from the positive supply, 256 are delivered to the load, and the other 128 Watts are returned to the negative supply. The power supply must be designed with this in mind, and the supply must be able to deal with the transferred power, by either holding the current in capacitors for future use, dissipating it as heat, or transferring it to the other supply. The first solution requires large capacitors, especially if low frequencies are to be amplified. The second solution is functional, but works in contradiction to the design philosophy of a Class D design, which is to improve efficiency. The third solution requires additional circuitry, increasing cost and complexity.

Figure 4:
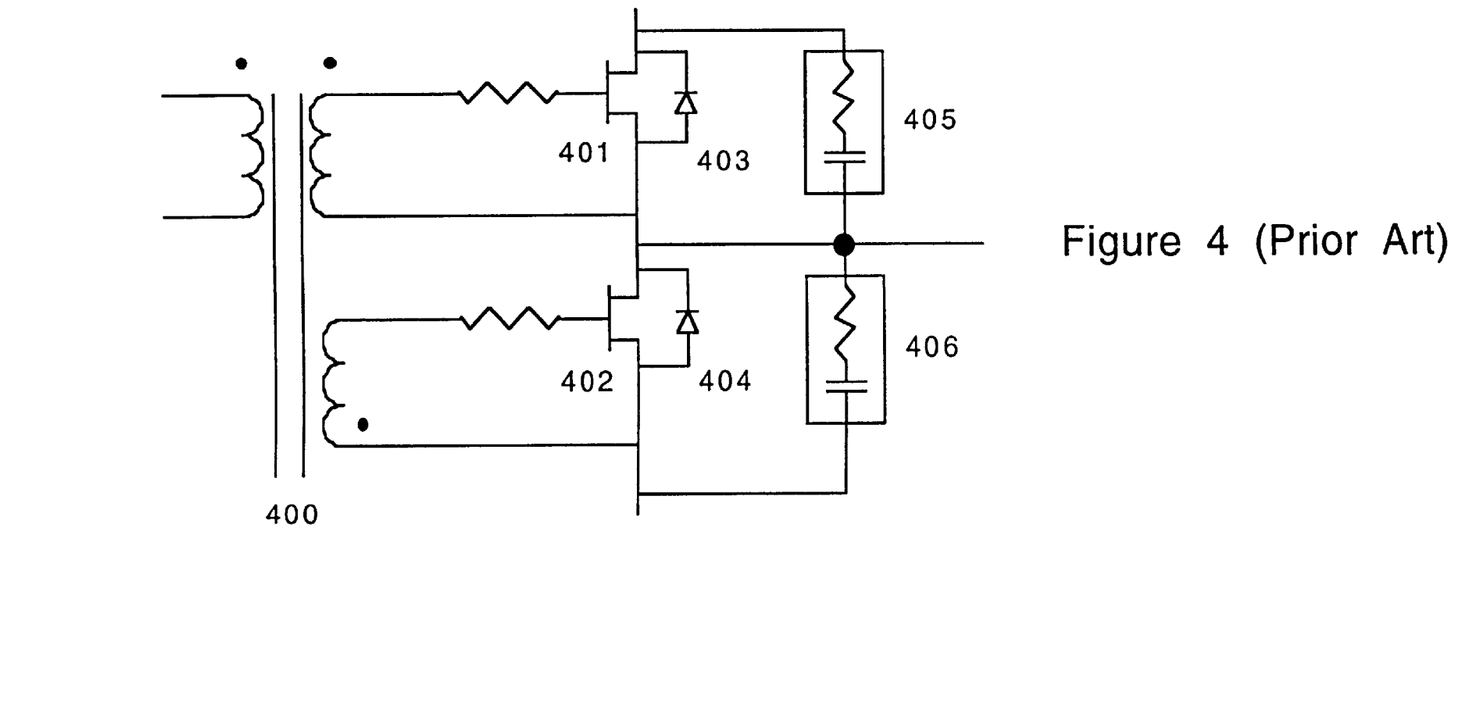
FIG. 4 (prior art) is a block diagram showing one implementation of the SPDT switch of FIG. 1.

FIG. 4 (prior art) shows one implementation of the SPDT switch, using power field effect transistors. Transistors 401 and 402 are FETs, diodes 403 and 404 are catch diodes to protect the transistors during the switching period, and circuits 405 and 406 are snubbing networks to control the wave shape during switching. Transformer 400, wired with its outputs complimentary, ensures that exactly one of the transistors is on at any time, and provides the gate drive. In other known designs, the switches may be bipolar transistors, insulated gate bipolar transistors, or other devices. The drive may come from other transformer configurations, level shifters, or optical couplers. Those versed in the art can devise many different implementations of the switch unit.

A need remains in the art for an output stage for Class D amplifiers and the like, that places less demands on its power supply, does not require large de-coupling capacitors and works with a ground referenced output.

SUMMARY OF INVENTION

It is an object of the present invention to provide an output stage for Class D amplifiers and the like, that places less demands on its power supply, does not require large de-coupling capacitors and works with a ground referenced output.

A switching output stage according to the present invention includes a floating power supply providing a relative positive output voltage VP at a first line and a relative negative output voltage VM at a second line, a first single pole, double throw switch connected across the first line and the second line, a second single pole, double throw switch connected across the first line and the second line, a low pass filter connected to the output of the second switch, and means for connecting the output of the low pass filter to a load.

The first switch has a common to ground and switches between position A to the first line and position B the second line, and the second switch has a common to the low pass filter and switches between position C to the first line and position D to the second line. Thus, the input to the low pass filter can take on three values, VP, VM, and 0. The input VP to the filter is achieved by switching the first switch to VM and the second switch to VP, and the input VM to the filter is achieved by switching the first switch to VP and the second switch to VM. The output stage of claim 3, wherein the input 0 to the filter is achieved in two ways, by either switching the first switch and the second switch to VP, or by switching the first switch and the second switch to VM.

The order of switch transition includes the following transitions:
AC->(BC or AD)->BD->(BC or AD)->AC. The order of switch transition also includes the following transitions: AC->BD, and BD->AC. 0 states AC and BD are selected alternately, one each in every other cycle.

The output stage also includes circuitry for sensing current connected to the first switch. This circuitry includes a resistor connected between the first switch and ground, and provides an output control signal based on the sensed current.

A pulse wave modulator (PWM) stage controls the first switch and the second switch, responsive to the output control signal.

An amplifier according to the present invention includes means for receiving two (or more) channels of audio signal, two PWMs for generating a series of pulses responsive to each received audio channel, an output stage as described above connected to each PWM, and means for connecting the output of each output stage to a load.

DETAILED DESCRIPTION OF THE PREFERRED EMBODIMENTS

Figure 5:
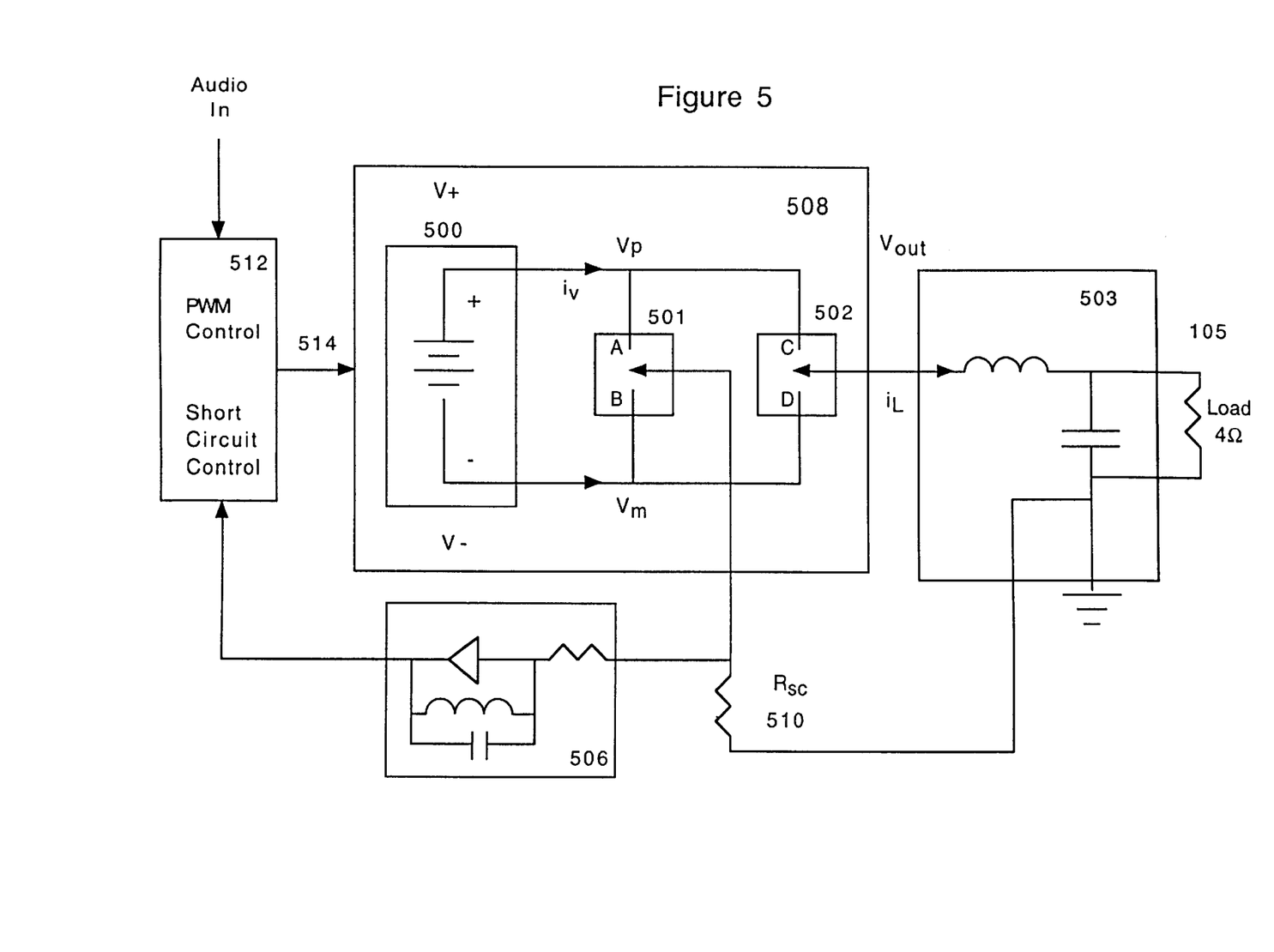
FIG. 5 is a block diagram showing the preferred embodiment of the output stage according to the present invention.

FIG. 5 is a block diagram showing the preferred embodiment of output stage 508 according to the present invention. Floating power supply 500 provides a single output, with positive terminal Vp and negative terminal Vm. Switch 501 connects one terminal or the other of the supply to ground through current sense resistor 510. The common terminal of the second switch, 502, is the input to low pass filter 503. Switches 501 and 502 are controlled by PWM block 512 via control signal 514. Current sense block 506 and current sense resistor 510 are optional, but desirable, for monitoring the load current.

Output stage 508 includes a single, floating output, power supply 500 (a single supply is used per output). Neither terminal of the supply is referenced to ground or to any signal other than the other supply pin. The two SPDT switches 501 and 502 are designed as in the prior art. When 501 is in the A position, the supply can supply negative voltage from vm. When in the B position, it can supply only positive voltage. Switch 502 connects Vm or Vp to the low pass filter, 503. The following switch combinations produce the tabulated results:

| 501 | 503 Vout |
|-----|----------|
| A C | 0 |
| B C | Positive voltage |
| A D | Negative voltage |
| B D | 0 |

In both the negative and positive cases, the magnitude of the output is equal to the supply voltage.

All energy is supplied by power supply 500, and no current needs to be recycled, stored, or dissipated. In addition, efficiency is improved by having three possible output states, and fidelity may also be improved. This is because there is less high frequency energy that must be removed by the filter, and less switching dissipation in the switches, as they only switch across half of the total voltage as compared to the prior art. If an output of −100 volts to +100 volts is desired, only a single 100 volt supply is required, and the switches only need to deal with 100 volts. In the prior art, both a ±100 volt and a −100 volt power supply would have been needed, and the switches would be operating across 200 volts.

With this circuit, either polarity of output can be provided from a single power supply, without the use of complex switching systems.

A further advantage of the system of FIG. 5 is the simplicity with which the load current $i_L$ is monitored. It is desirable to know what current is flowing into the load. If the output of the amplifier is shorted, the sensed current will allow the amplifier to save itself from potential self destruction or safety problems. The sensed current can also be used to monitor the state of the load, and to protect the load from overdrive. In prior art designs, it is difficult to insert current sense circuitry, and any resister must be floating, or multiple resistors must be used. In the floating supply case, resistor 510 is referenced to ground. A very small resistance can be used, as the voltage can easily be amplified by the nature of the signal being referenced to ground. A small resistance is desirable, as it impacts the efficiency of the amplifier the least. With the current sense resistor returned to ground, even the resistance of normal circuit wiring may be used as the resistor. Current sense circuitry 506 (e.g. comprising a resistor, and an op amp, an inductor, and a capacitor in parallel) amplifies the small voltage across the sense resistor 510, and the control circuitry may modify the control signals in such a way as to protect the amplifier or load.

As an example of the function made possible by the current sense function, if the current is too high for an extended period of time, the load itself may be damaged.

Control circuitry in block 512 can reduce the level of the signal being amplified in this case, in such a way as to protect the load.

In a similar way, the current sense function can protect the amplifier itself. The pulse width is reduced any time the current is excessive. If the output is shorted, for example, the current would grow to the maximum set by the control feedback, then the pulse width would be reduced, limiting the current to a safe value.

Figure 6:
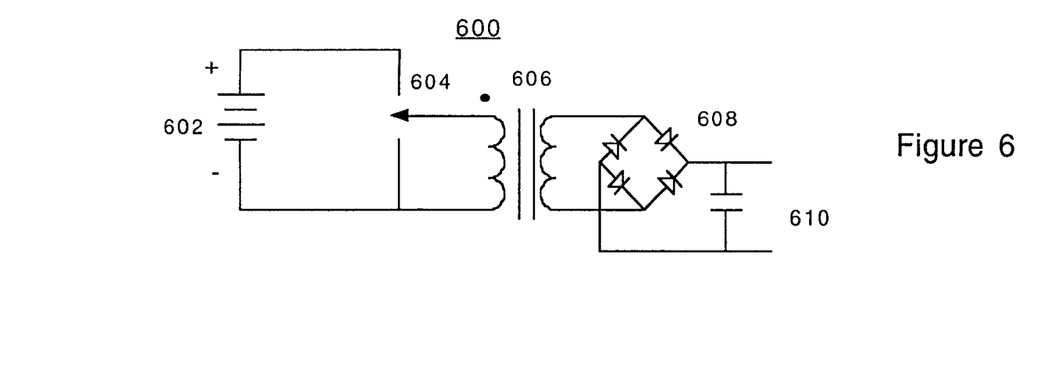
FIG. 6 is a block diagram showing one implementation of the power supply of FIG. 5.
Figure 7:
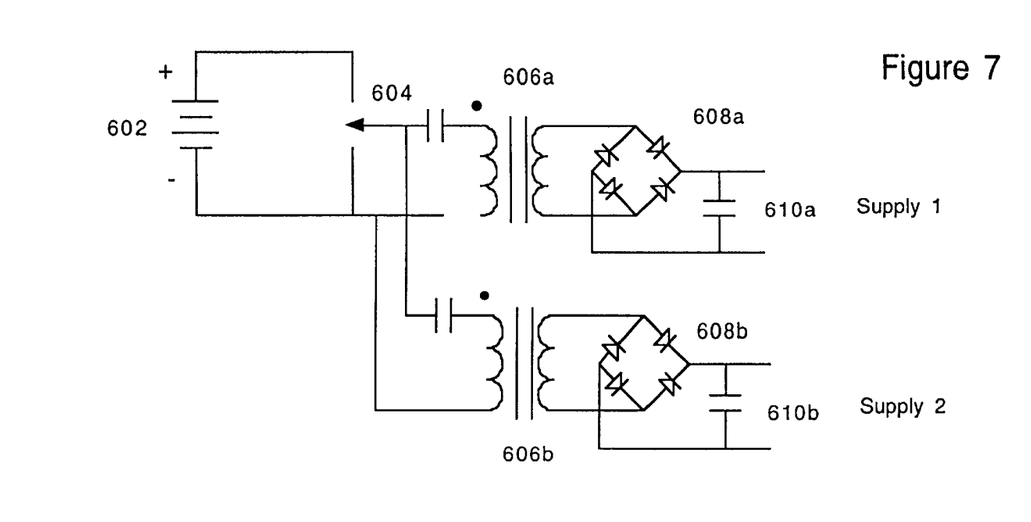
FIG. 7 is a block diagram of an implementation of a two output power supply configuration.

FIG. 6 is a block diagram showing one possible implementation 600 of power supply 500 of FIG. 5. The 350 volt main supply 602 would be connected to the power input, such as a voltage doubler off of 120 VAC, or a bridge rectifier and capacitor off of 240 VAC mains. This technology is well known to those versed in the art of switching power supply design. One floating supply 600 is generally required for each output. FIG. 7 is a block diagram of an implementation of a two output power supply configuration. Much of the circuitry may be shared between the channels. Even the transformer may be shared (not shown), with multiple secondary windings for the multiple outputs.

Switch 604, transformer 606, rectifier 608, and output capacitor 610 comprise the floating power supply, and these components must be replicated for each channel.

Figure 8:
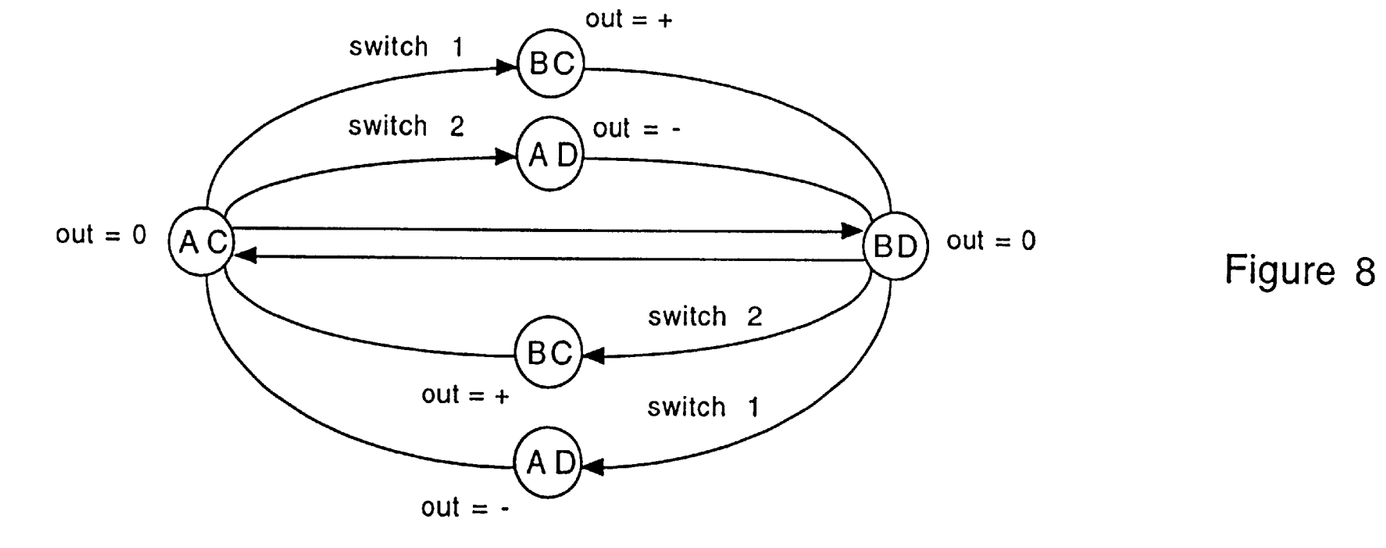
FIG. 8 is a state diagram showing the preferred state transitions of the switches of FIG. 5.

FIG. 8 is a state diagram showing the preferred state transitions of the switches of FIG. 5. Two different switch settings produce the 0 output state, AC and BD. In the preferred embodiment, these two states are both used. If the system starts in state AC, the next state would be BC for a positive output, AD for a negative output, and BD if the output is to stay at 0. If a positive or negative pulse was created, the state returns to BD for a 0 output. In the next cycle, the path is BD to BC for a positive output, AD for a negative output, and AC for a 0 output, finally returning to AC. In this way, each switch is flipped once in each pair of cycles. This consistent use of the switches minimizes switch induced distortion by making the switch transition rate constant.

Figure 9:
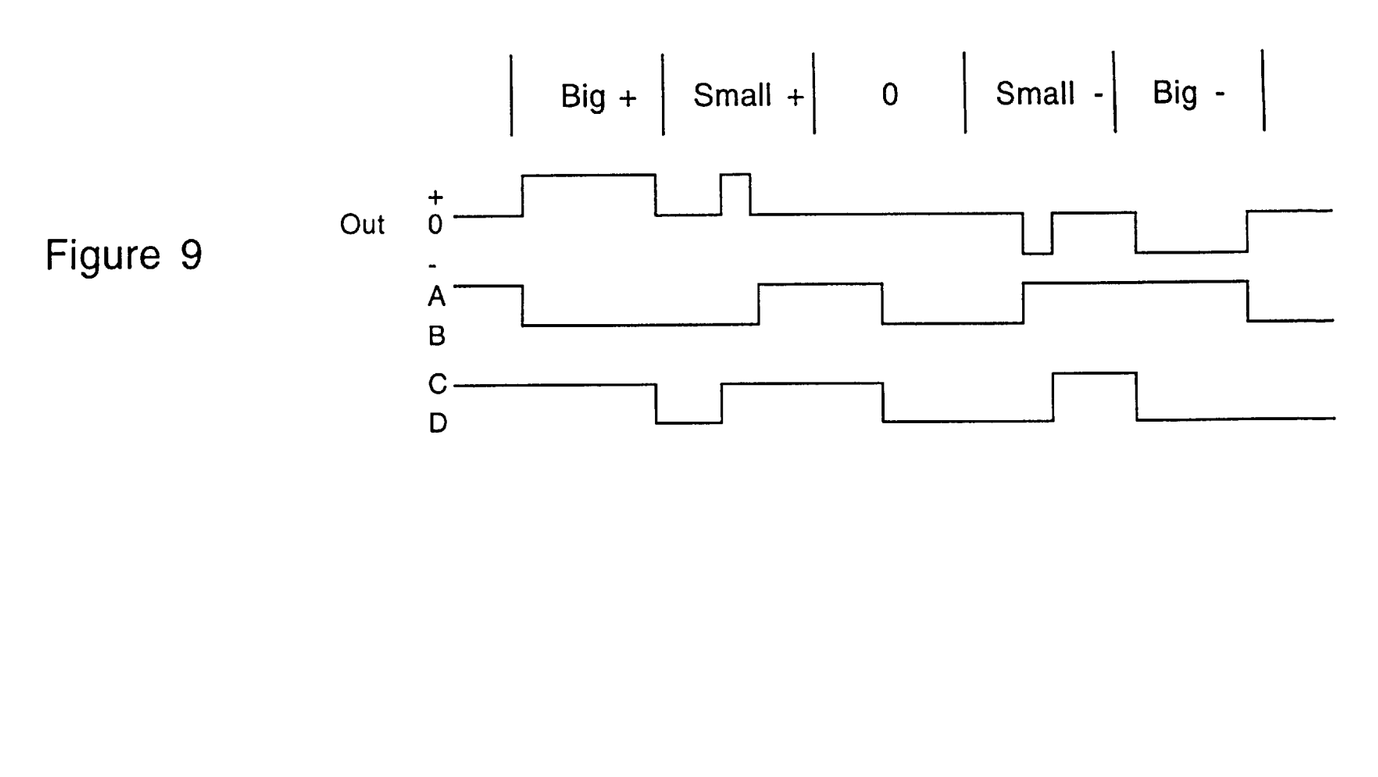
FIG. 9 is a plot the position of the switches of FIG. 5, given the state diagram of FIG. 8, for a desired output.

FIG. 9 is a plot showing the position of the switches of FIG. 5, given the state diagram of FIG. 8, for a desired output. FIG. 9 shows the resulting waveforms for 5 cycles of a PWM output, with the cycles being large positive, small positive, 0, small negative, and large negative. As can be seen, the switches operate at a constant rate, with the variation being controlled by the phase (timing) within that rate.

Figure 10:
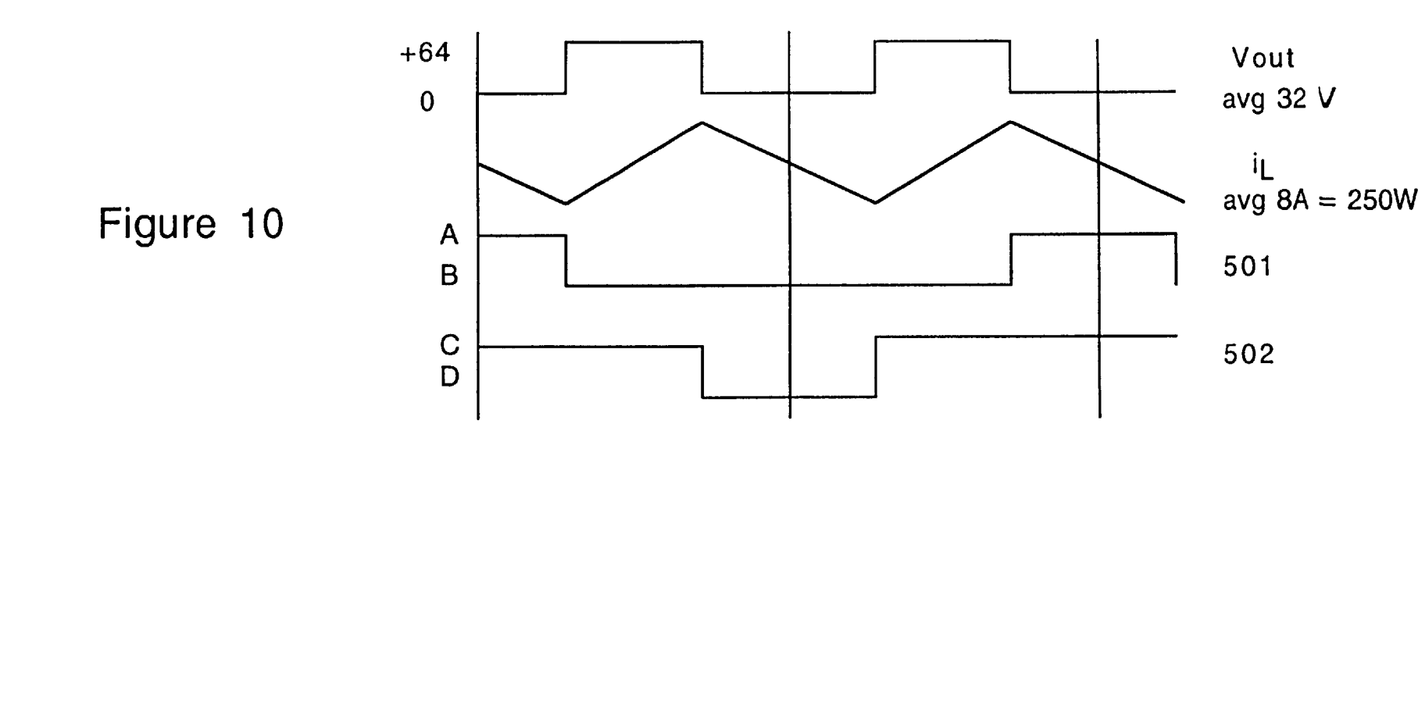
FIGS. 10 and 11 are a set of plots showing various waveforms for a constant 32 V output from the output stage of FIG. 5.
Figure 11:
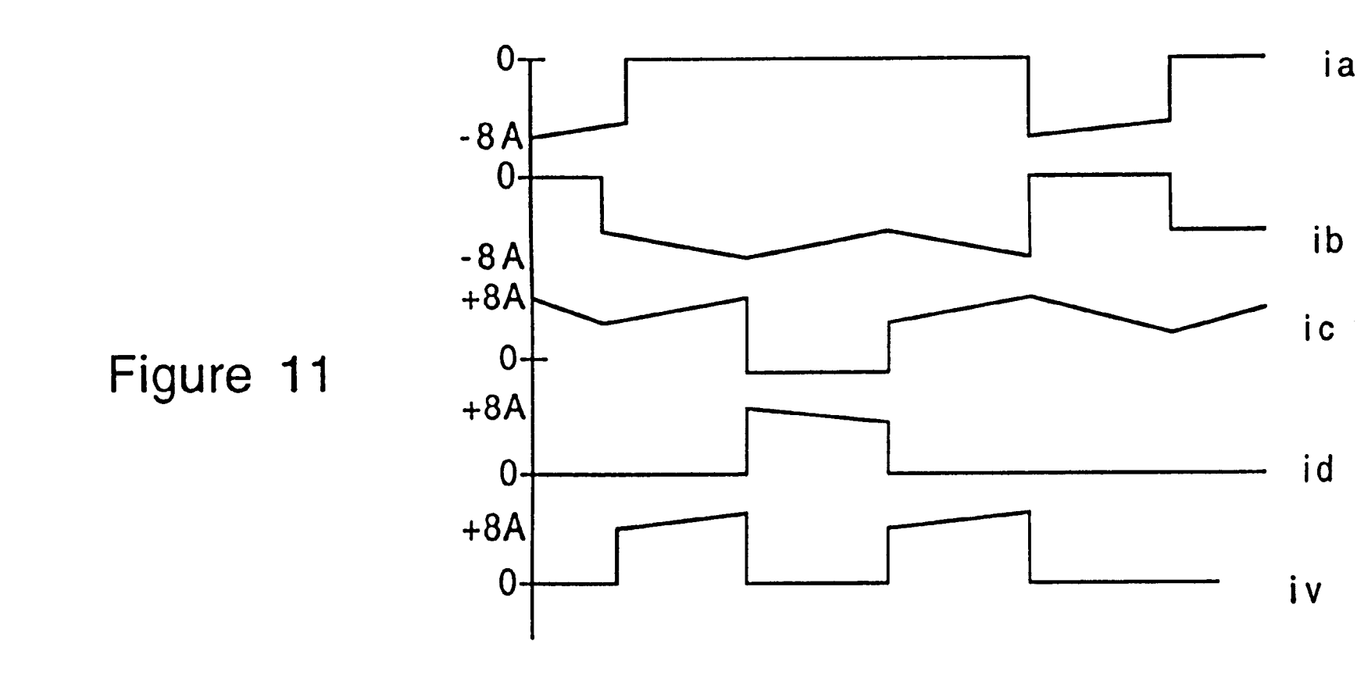

FIGS. 10 and 11 are a set of plots showing various waveforms for a constant 32 V output from the output stage of FIG. 5. FIG. 10 shows the output voltage Vout, the output current $i_L$, and the state of switches 501 and 502. FIG. 11 shows the currents at the switches and $i_v$, the current out of power supply 500. With perfect switches, 256 Watts is provided by the floating power supply, and 256 Watts is delivered to the load.

Figure 12:
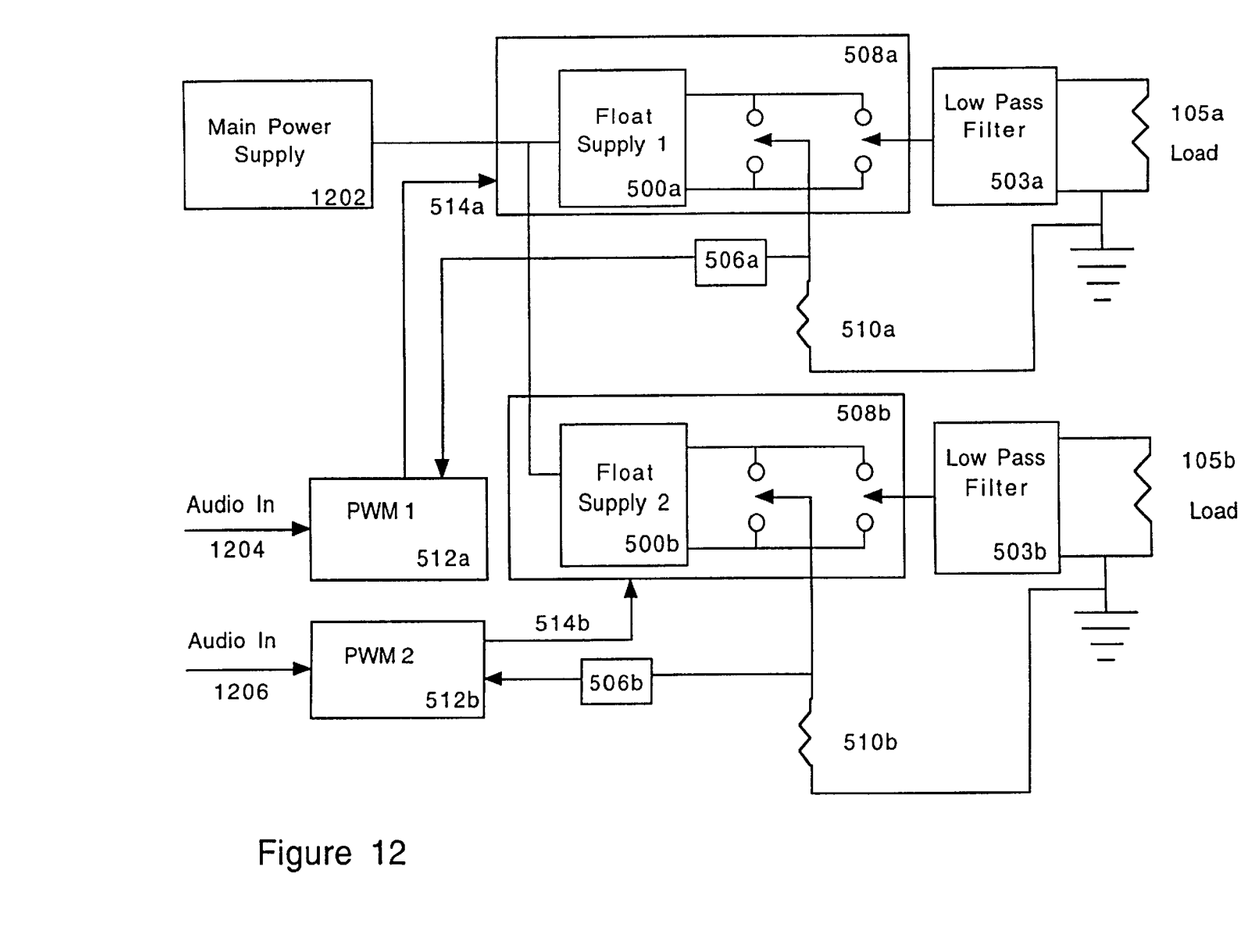
FIG. 12 is a block diagram showing a stereo amplifier utilizing two output stages according to the present invention.

FIG. 12 shows a stereo amplifier built using the invention, with two output stages 508 powered by main supply 1202, two pulse width modulation controllers 512 controlling two sets of switches 501, 502 and two outputs to loads 105, via filters 503. Again, the two outputs are separate, including the power supplies. For more output channels, these components are required for every output.

It will be appreciated by one versed in the art that there are many possible variations on this design, but all are typified by an output stage utilizing a floating power supply and switch combination similar to that described above.

What is claimed is:

1. A switching output stage comprising:

a floating power supply providing a relative positive output voltage VP at a first line and a relative negative output voltage VM at a second line;

a first single pole, double throw switch connected across the first line and the second line;

a second single pole, double throw switch connected across the first line and the second line;

a low pass filter connected to the output of the second switch;

means for connecting the output of the low pass filter to a positive load terminal; and means for connecting ground to a negative load terminal;

wherein the first switch has a common to ground and switches between position A to the first line and position B to the second line, and the second switch has a common to the low pass filter and switches between position C to the first line and position D to the second line;

such that the voltage across the load is positive when the switches o are in positions B and C, negative when the switches are in positions A and D, 0 when the switches are in positions A and C wherein both terminals are connected to VP, and 0 when the switches are in positions B and D wherein both terminals are connected to VM.

2. The output stage of claim 1, wherein:

the input VP to the filter is achieved by switching the first switch to VM and the second switch to VP; and the input VM to the filter is achieved by switching the first switch to VP and the second switch to VM.

3. The output stage of claim 2, wherein the input 0 to the filter is achieved in two ways, by either switching the first switch and the second switch to VP, or by switching the first switch and the second switch to VM.

4. The output stage of claim 1, wherein the order of switch transition includes the following transitions:

AC->(BC or AD)->BD->(BC or AD)->AC.

5. The output stage of claim 4, wherein the order of switch transition further includes the following transitions:

AC->BD;

and

BD->AC.

6. The output stage of claim 5, wherein 0 states AC and BD are selected alternately, one each in every other cycle.

7. The output stage of claim 1, further including: means for sensing current connected to the first switch.

8. The output stage of claim 7, wherein the means for sensing current includes a resistor connected between the first switch and ground.

9. The output stage of claim 8, wherein the means for sensing current further includes means for providing an output control signal based on the sensed current.

10. The output stage of claim 9, further including a PWM stage including means for controlling the first switch and the second switch, and further including means for sensing the output control signal from the current sensing means, wherein the means for controlling the switches is responsive to the output control signal.

11. An amplifier comprising:

means for receiving two channels of audio signal;

two PWMs for generating a series of pulses responsive to each received audio channel;

an output stage connected to each PWM, each output stage including—
- a floating power supply providing a relative positive output voltage VP at a first line and a relative negative output voltage VM at a second line;
- a first single pole, double throw switch connected across the first line and the second line, said first switch responsive to the series of pulses;
- a second single pole, double throw switch connected across the first line and the second line, said second switch responsive to the series of pulses; and
- a low pass filter connected to the output of the second switch;
- wherein the first switch has a common to ground and switches between position A to the first line and position B the second line, and the second switch has a common to the low pass filter and switches between position C to the first line and position D to the second line; and means for connecting the output of each output stage to a load.

12. The amplifier of claim 11, wherein the input to each low pass filter can take on three values, VP, VM, and 0.

13. The amplifier of claim 12, wherein:

the input VP to each filter is achieved by switching the respective first switch to VM and the respective second switch to VP; and the input VM to the filter is achieved by switching the respective first switch to VP and the respective second switch to VM.

14. The amplifier of claim 13, wherein the input 0 to each filter is achieved in two ways, by either switching the respective first switch and the respective second switch to VP, or by switching the respective first switch and the respective second switch to VM.

15. The amplifier of claim 14, wherein the order of switch transition includes the following transitions:

AC->(BC or AD)->BD->(BC or AD)->AC.

16. The amplifier of claim 15, wherein the order of switch transition further includes the following transitions:

AC->BD;

and

BD->AC.

17. The amplifier of claim 16, wherein 0 states AC and BD are selected alternately, one each in every other cycle.

18. The amplifier of claim 11, further comprising:

means for sensing current connected to each of the first switches.

19. The amplifier of claim 18, wherein each means for sensing current includes a resistor connected between the respective first switch and ground.

20. The amplifier of claim 19, wherein each means for sensing current further includes means for providing an output control signal based on the sensed current.

21. The amplifier of claim 20, wherein each PWM stage further includes means for sensing the output control signal from the respective current sensing means, wherein the series of pulses generated by each PWM is responsive to the respective output control signal.

* * * * *